US012701035B2

(12) United States Patent
Arora et al.

(10) Patent No.: US 12,701,035 B2
(45) Date of Patent: Aug. 4, 2026

(54) METHOD AND SYSTEM FOR IMPROVING BOOT PROCESS OF A MEMORY USING ENHANCED DFE TRAINING TECHNIQUE

(71) Applicant: Samsung Electronics Co., Ltd.,
Suwon-si (KR)

(72) Inventors: Abhinav Arora, Bengaluru (IN);
Aayushi Chauhan, Bengaluru (IN);
Afreen Shaik, Bengaluru (IN); **Gabriel
Cho**, Seoul (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 0 days.

(21) Appl. No.: 18/929,875

(22) Filed: Oct. 29, 2024

(65) Prior Publication Data

US 2025/0343712 A1 Nov. 6, 2025

(30) Foreign Application Priority Data

May 1, 2024 (IN) .............................. 202441034562

(51) Int. Cl.
*H04L 25/03* (2006.01)

(52) U.S. Cl.
CPC .. *H04L 25/03057* (2013.01); *H04L 25/03885*
(2013.01)

(58) Field of Classification Search
CPC .................... H04L 25/03885; H04L 25/03057
See application file for complete search history.

(56) References Cited

U.S. PATENT DOCUMENTS 11,323,296 B1    5/2022   Gugwad et al.
11,360,874 B2    6/2022   Morris
11,423,303 B1 *  8/2022   Jiao .......................... G06N 3/08
11,483,185 B1   10/2022   Gugwad et al.

OTHER PUBLICATIONS

Bobi Shi et al., "Decision Feedback Equalizer (DFE) Taps Estima-
tion with Machine Learning Methods", 2021 IEEE Electrical Design
of Advanced Packaging and Systems (EDAPS).

* cited by examiner

*Primary Examiner* — Rahel Guarino
(74) *Attorney, Agent, or Firm* — Fish & Richardson P.C.

(57) ABSTRACT

Various example embodiments are directed to techniques for
a booting process of a memory device using a Decision
Feedback Equalizer (DFE) training technique. A method
may include predicting one or more DFE tap values based on
a plurality of configuration parameters of the memory
device, determining an accuracy level of the predicted one
or more DFE tap values based on a signal processed using
the predicted one or more DFE tap values, and in response
to the accuracy level of the predicted one or more DFE tap
values being above an accuracy threshold value, setting a
value of a prediction flag as TRUE, validating a plurality of
eye margins of the signal processed using the predicted DFE
tap values, storing the predicted DFE tap values based on
results of the validation, and performing a subsequent boot
process of the memory device using the predicted DFE tap
values.

10 Claims, 3 Drawing Sheets

<u>200</u>

100

Host Unit 110

Processing unit 112

Data/Address Bus

114

Storage Unit 116

Persistent Storage 118

Memory Controller 120

Volatile Memory 122

Flash Memory 124

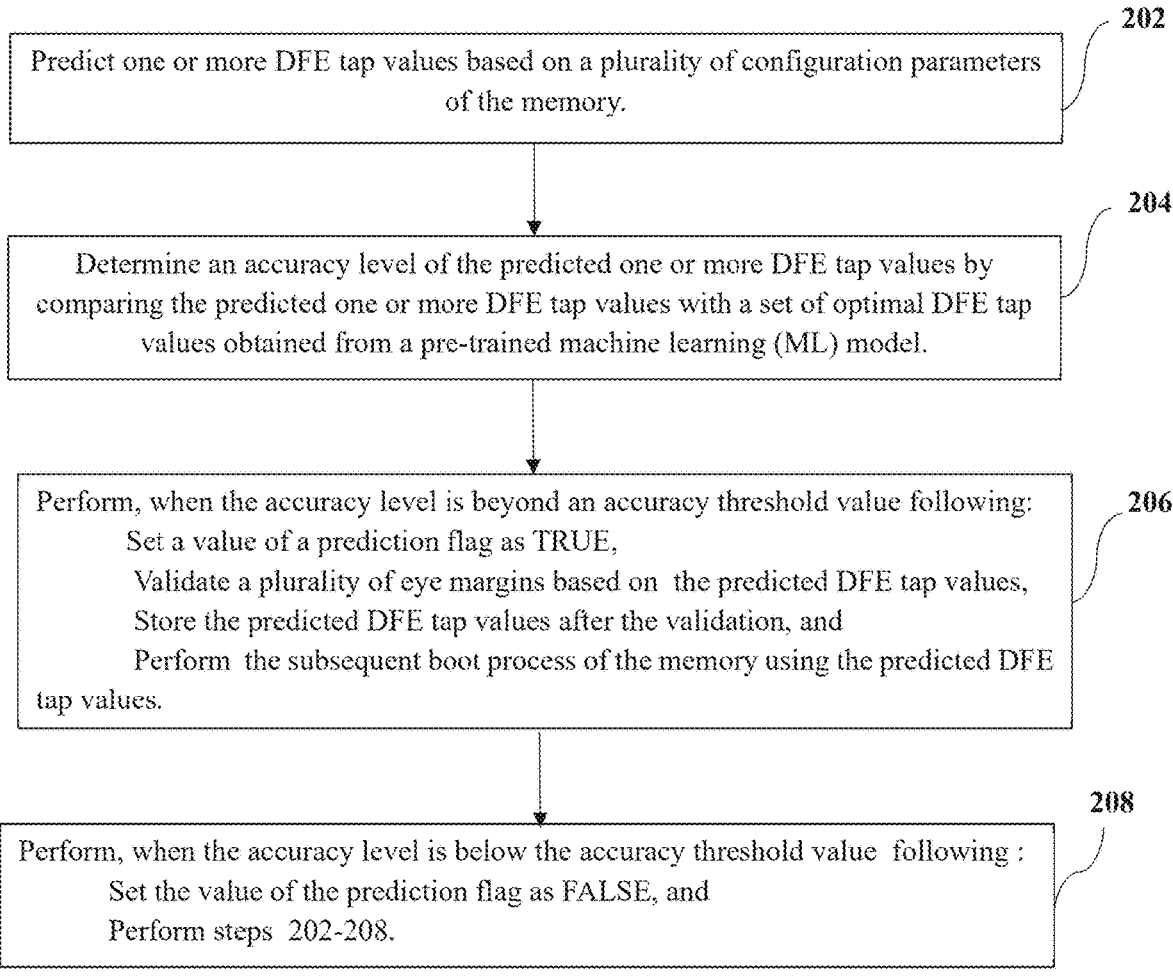

200

202

Predict one or more DFE tap values based on a plurality of configuration parameters of the memory.

204

Determine an accuracy level of the predicted one or more DFE tap values by comparing the predicted one or more DFE tap values with a set of optimal DFE tap values obtained from a pre-trained machine learning (ML) model.

206

Perform, when the accuracy level is beyond an accuracy threshold value following:
    Set a value of a prediction flag as TRUE,
    Validate a plurality of eye margins based on the predicted DFE tap values,
    Store the predicted DFE tap values after the validation, and
    Perform the subsequent boot process of the memory using the predicted DFE tap values.

208

Perform, when the accuracy level is below the accuracy threshold value following :
    Set the value of the prediction flag as FALSE, and
    Perform steps 202-208.

Figure 2

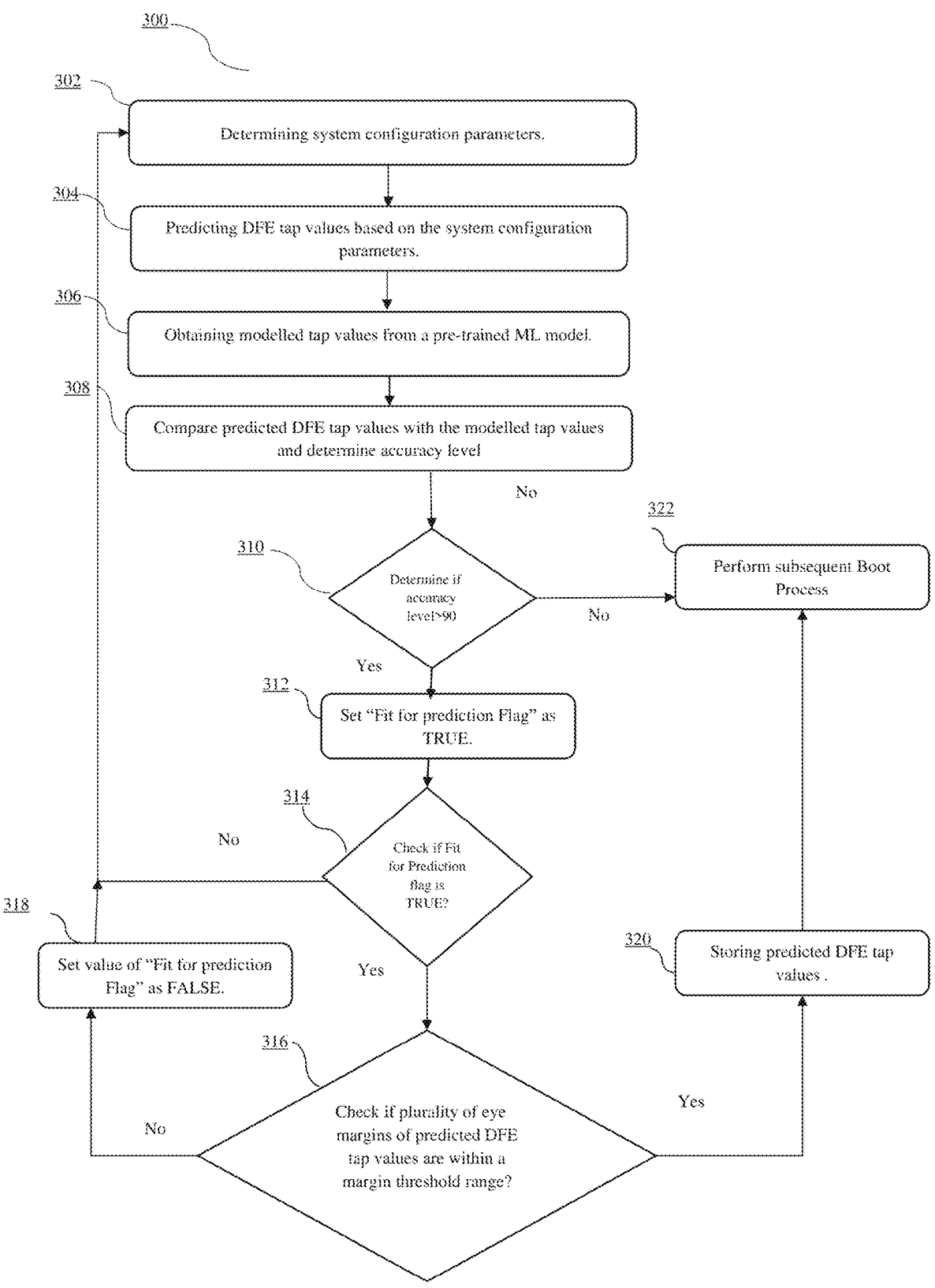

300

302 Determining system configuration parameters.

304 Predicting DFE tap values based on the system configuration parameters.

306 Obtaining modelled tap values from a pre-trained ML model.

308 Compare predicted DFE tap values with the modelled tap values and determine accuracy level 310 Determine if accuracy level>90

No

322 Perform subsequent Boot Process

No

Yes

312 Set "Fit for prediction Flag" as TRUE.

314 Check if Fit for Prediction flag is TRUE?

No

318 Set value of "Fit for prediction Flag" as FALSE.

320 Storing predicted DFE tap values.

Yes

316 Check if plurality of eye margins of predicted DFE tap values are within a margin threshold range?

No

Yes

Figure 3

METHOD AND SYSTEM FOR IMPROVING BOOT PROCESS OF A MEMORY USING ENHANCED DFE TRAINING TECHNIQUE

CROSS-REFERENCE TO RELATED APPLICATIONS

This U.S. non-provisional application claims the benefit of priority under 35 U.S.C. § 119 to Indian Patent Application 202441034562 filed on May 1, 2024, in the Indian Intellectual Property Office, the disclosure of which is incorporated by reference herein in its entirety.

TECHNICAL FIELD

Various example embodiments of the inventive concepts generally relate to storage devices, systems including storage devices, and/or methods of operating storage devices, etc. Particularly, one or more example embodiments of the inventive concepts relate to techniques for booting a memory device using a Decision Feedback Equalizer (DFE) training technique, a storage device including the memory device, a system including the memory device, and/or a method of operating the memory device, etc.

BACKGROUND

Typically, a Basic Input/Output System (BIOS) is used for initializing various input and/or output devices connected to a computer. BIOS triggers a booting process and loads initialization programs associated with connected devices into main memory of the computer to make the connected devices operable. Memory Reference Code (MRC) is an important aspect of BIOS and is the firmware responsible for initializing the main memory. The MRC typically includes information about memory settings, frequency, timing, driving, and/or operations of the memory controller, etc. Based on the system configurations, MRC performs various training during the booting process to improve and/or optimize the existing memory settings for improved performance.

In dynamic random-access memory (DRAM) devices, when data and command/address signals are transmitted from a host unit, the signals suffer from inter-symbol interference (ISI). ISI is a major issue faced by recent DRAM solutions that offer high speed and high data transfer rates, such as Double Data Rate (DDR) 4 and DDR5. Decision Feedback Equalizer (DFE) training is one memory device training that is performed during the boot process to remove the noise and interference from transmitted signals. The DFE training may increase the total boot time of a memory device.

The information disclosed in this background section is only for enhancement of understanding of the general background of the inventive concepts and should not be taken as an acknowledgment or any form of suggestion that this information forms the prior art already known to a person of ordinary skill in the art.

SUMMARY

One or more shortcomings discussed above may be overcome and additional advantages may be provided by various example embodiments of the inventive concepts.

In at least one example embodiment of the inventive concepts, a desire and/or need for improving and/or optimizing the boot process of a memory device is addressed. Thus, at least one example embodiment of inventive concepts uses a Decision Feedback Equalizer (DFE) training technique to effectively utilize time and/or resources when performing the boot process of a memory device.

At least one example embodiment of the inventive concepts offers to identify improved and/or optimal DFE tap values within a short and/or shorter period of time.

At least one example embodiment of the inventive concepts discloses a method for booting a memory device using a Decision Feedback Equalizer (DFE) training technique. The method comprises predicting one or more DFE tap values based on a plurality of configuration parameters of the memory device, determining an accuracy level of the predicted one or more DFE tap values based on a signal processed using the predicted one or more DFE tap values and the signal processed using a set of comparative DFE tap values obtained from a trained machine learning (ML) model, in response to the accuracy level of the predicted one or more DFE tap values being above an accuracy threshold value, setting a value of a prediction flag as TRUE, validating a plurality of eye margins of the signal processed using the predicted DFE tap values, storing the predicted DFE tap values based on results of the validation, and performing a subsequent boot process of the memory device using the predicted DFE tap values.

In some example embodiments of the inventive concepts, the plurality of configuration parameters comprises one or more of: alternating current (AC) parameters, direct current (DC) parameters, total number of Dual In-line Memory Module (DIMMs) in the memory, size of the DIMMs, or any combinations thereof.

In some example embodiments of the inventive concepts, the validating the plurality of eye margins further comprises determining whether the plurality of eye margins is within an eye margin threshold range.

In some example embodiments of the inventive concepts, in response to the plurality of eye margins not being within the eye margin threshold range, the method further comprises setting the value of the prediction flag as FALSE.

At least one example embodiment of the inventive concepts discloses a system for booting a memory device using a Decision Feedback Equalizer (DFE) training technique. The system comprises processing circuitry configured to predict one or more DFE tap values based on a plurality of configuration parameters of the memory device, determine an accuracy level of the predicted one or more DFE tap values based on a signal processed using the predicted one or more DFE tap values and the signal processed using a set of comparative DFE tap values obtained from a trained machine learning (ML) model, and in response to the accuracy level being above an accuracy threshold value, setting a value of a prediction flag as TRUE, validating a plurality of eye margins of the signal processed using the predicted DFE tap values, storing the predicted DFE tap values based on results of the validation, and performing the a subsequent boot process of the memory device (122) using the predicted DFE tap values In some example embodiments of the inventive concepts, the plurality of configuration parameters comprises one or more of: alternating current (AC) parameters, direct current (DC) parameters, total number of Dual In-line Memory Module (DIMMs) in the memory device, size of the DIMMs, or any combinations thereof.

In some example embodiments of the inventive concepts, in response to the accuracy level being above the accuracy threshold value, the processing circuitry is further configured to determine whether the plurality of eye margins is within an eye margin threshold range.

In some example embodiments of the inventive concepts, in response to the plurality of eye margins not being within the eye margin threshold range, the processing circuitry is further configured to set the value of the prediction flag as FALSE.

BRIEF DESCRIPTION OF THE DRAWINGS

Further aspects and advantages of various example embodiments of the inventive concepts will be readily understood from the following detailed description with reference to the accompanying drawings. Reference numerals have been used to refer to identical or functionally similar elements. The figures together with a detailed description below are incorporated in and form part of the specification and serve to further illustrate the example embodiments and explain various principles and advantages, in accordance with the inventive concepts wherein:

FIG. 2 illustrates a flow chart of a method 200 for booting a memory 122 using a Decision Feedback Equalizer (DFE) training technique, in accordance with at least one example embodiment of the inventive concepts; and FIG. 3 illustrates a flow chart of another example method 300 for booting a memory 122 using a DFE training technique, in accordance with at least one example embodiment of the inventive concepts.

Figure 1:
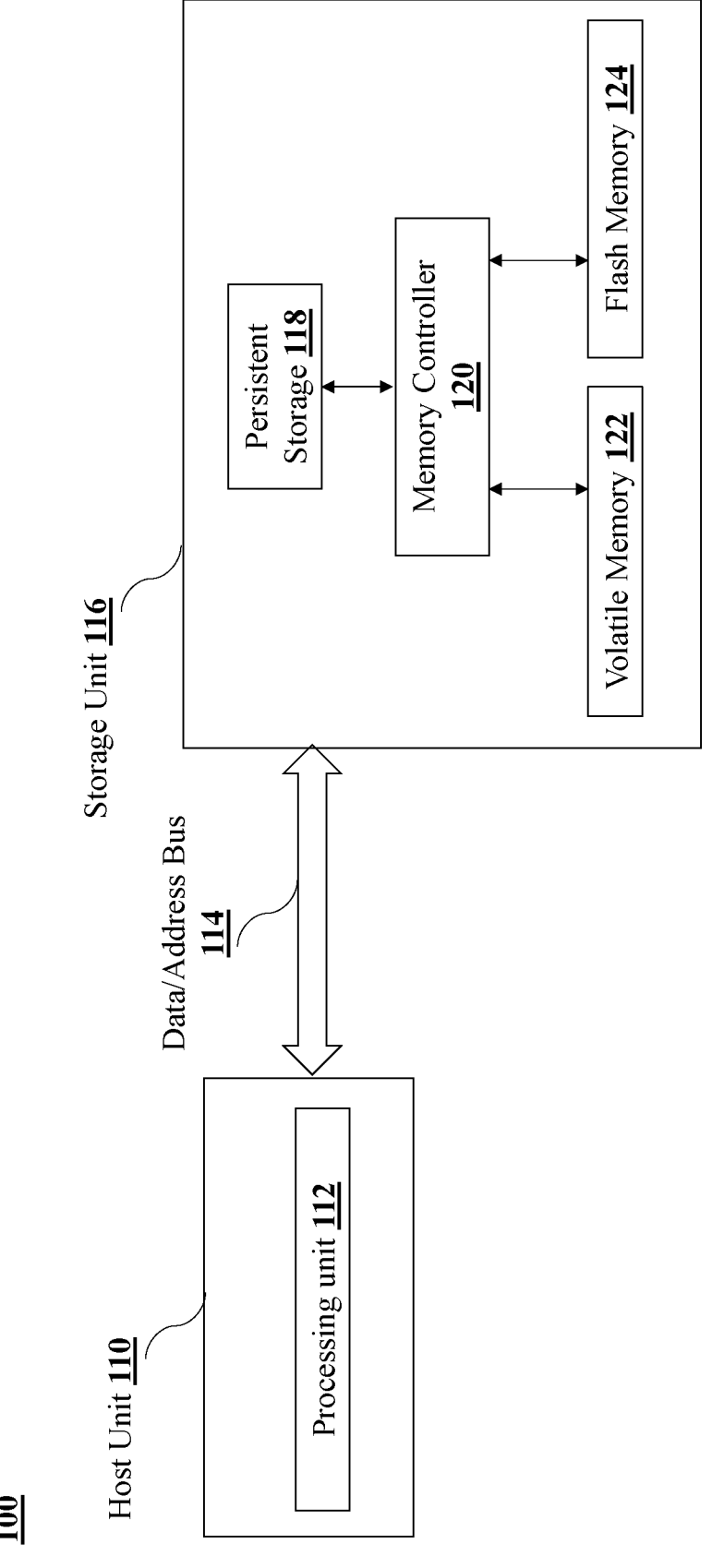
FIG. 1 illustrates a high-level block diagram of an example storage system 100 comprising a host unit 110 configured to communicate with a storage unit 120 according to at least one example embodiment of the inventive concepts.

It should be appreciated by those skilled in the art that any block diagrams herein represent conceptual views of the illustrative systems embodying the principles of the example embodiments of the inventive concepts. Similarly, it will be appreciated that any flowcharts, flow diagrams, state transition diagrams, pseudo code, and the like represent various processes which may be substantially represented in computer-readable medium and executed by a computer or processor, whether or not such computer or processor is explicitly shown.

DETAILED DESCRIPTION

In some aspects, the time taken up in performing the DFE training may be reduced and/or minimized, in order to reduce the total boot time of a memory device.

While the example embodiments of the inventive concepts are susceptible to various modifications and alternative forms, some example embodiments thereof have been shown by way of example in the drawings and will be described in detail below. It should be understood, however that it is not intended to limit the inventive concepts to the particular forms disclosed, but on the contrary, the disclosure is to cover all modifications, equivalents, and alternatives falling within the scope of the inventive concepts.

The terms like "SSD" and "SSD device" and "storage device" have been used interchangeably throughout. Further, the terms like "host" and "host unit" and "host computer" have been used interchangeably throughout. The terms like "host controller" and "processor" and "processing unit" and "central processing unit" have been used interchangeably throughout. The terms like "memory" and "memory device" and "main memory" and "volatile memory" and "RAM" have been used interchangeably throughout.

A boot time is the amount of time taken by the main memory of the computer system to complete a boot process and initialize various input and/or output devices connected to the computer system. The main memory of the system may be a volatile memory including a plurality of a memory channels known as dual-inline memory modules (DIMMs), but is not limited thereto. A Basic Input/Output System (BIOS) triggers the booting process and loads and executes various initialization programs in a desired and/or predetermined sequence in the main memory. Memory Reference Code (MRC) is a part of the reference BIOS code and is responsible for initializing the memory as part of the Power-On Self-Test (POST) process when the computer system is first powered up.

The MRC typically includes information related to, associated with, and/or corresponding to memory settings, frequency, timing, driving, operations of the memory controller, etc., but is not limited thereto. Based on the system configurations, MRC performs various trainings during the booting process to improve and/or optimize the existing memory settings for an improved and/or optimal performance, etc. The memory settings are tuned via a training procedure and may be stored in non-volatile storage for future use.

One of the memory training procedures performed by the MRC is Decision Feedback Equalizer (DFE) training. Typically, a DFE training is performed to mitigate the effects of inter-symbol interference (ISI). Essentially, the DFE equalizes and/or adjusts the data and/or command/address signals transmitted from a host (e.g., host device, external device, etc.) based on certain feedback signals to remove noise and/or interference from the received signals.

To mitigate the effects of ISI, the Joint Electron Device Engineering Council (JEDEC) introduced the decision feedback equalization (DFE) technique, initially in the data buffer of DDR4 memory and later in the data buffer and clock driver of DDR5.

The DFE training technique is implemented using one or more variables known as taps. Taps are physical parameters associated with voltage and/or signal phase-changes of the received signals. Each tap variable is associated with a range of coefficient values. Depending on the configuration and type of DIMM, a tap may have a desired and/or predetermined range of coefficient values. For example, a tap variable can have a range of values from −140 to 140.

In the DFE training phase, the comparative tap values from the range of tap values are determined using a set of desired and/or pre-determined techniques/algorithms. Conventionally, a brute force technique/algorithm is used to calculate the desired and/or optimum tap values. Other techniques/algorithms used may be greedy sweep technique/algorithm and/or a coarse fine tuning that check the range of values through desired and/or pre-determined step-sizes for faster determination of the optimum tap value.

These identified tap values are then fed to DFE circuits to remove and/or compensate for distortion, interference and/or noise from the received signals. The DFE tap values are applied to the data path using memory system settings and/or configurations. The comparative tap values are determined in such a way that they are tuned to remove the distortion, interference, and/or noise from data and/or command/address signals received from the host computer, etc.

The ISI may be caused by channel bandwidth limitations and/or reflections, but is not limited thereto. When data signals are received from the host computer, the received signals are monitored and analysed using a data integrity check. As a part of the conventional data integrity check mechanism, eye diagrams of the data signals are created and/or generated to determine the quality and/or correctness of signal integrity. Eye masks show the acceptable timing and/or amplitude of the received signal for a given bit error ratio (BER). When ISI is present, ISI causes the closing of an eye response in a received signal. By applying DFE, a closed eye in a received signal may be opened. The larger the eye height and eye width in the eye diagram of the received signal, the better the signal integrity of the signal. Thus, accurately computing the DFE tap values is a desired and/or essential part of the DFE training, as small variations in DFE tap values may result in huge variations in the quality and/or integrity of signals. After the DFE training, an eye margin validation process may be performed to check the width and height of the eye of a data signal and determine whether it meets a desired and/or pre-determined threshold range or not. This validation process confirms that the calculated DFE values are optimal and/or improved and may be used to equalize the noisy signals.

However, with newer DRAMs having faster and/or higher data transfer speeds due in part to increased data rates such as DDR4 and DDR5, etc., the DFE training process becomes more complicated and hence a lot of time is consumed in improving and/or optimizing the data signals. This directly impacts the booting process and boot time of the memory. For instance, in DDR5, DFE training usually takes 34% of the boot time, thus considerably impacting the system performance.

To solve some or all of the above-identified problems, various example embodiments of the inventive concepts disclose techniques for a Decision Feedback Equalizer (DFE) training that effectively utilizes time and/or resources thereby improving the computer system performance and/or the boot process of the memory.

FIG. 1 illustrates a block diagram of an example storage system 100 showing a host unit 110 (e.g., host device, etc.) communicatively coupled with at least one storage unit 116 according to at least one example embodiment of the inventive concepts. The host unit 110 may comprise at least one processing unit 112, etc., but is not limited thereto. Further, the storage unit 116 may comprise at least one memory controller 120, at least one persistent storage 118 (e.g., non-volatile memory, etc.), at least one volatile memory 122, and/or at least one flash memory 124, etc., but is not limited thereto. The memory controller 122 controls access to various locations of the volatile memory 122 and/or flash memory 124, etc. The volatile memory 122 may also be referred as the main memory that temporarily stores data and/or information to be transmitted to and/or received from the host unit 110, etc. In at least one example embodiment, data and/or instructions between the host unit 110 and the storage unit 116 are transferred through one or more data buses and/or address buses 126. According to some example embodiments, one or more of the processing unit 112, and/or the one memory controller 120, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment, the system 100 of FIG. 1 may be any mobile or non-mobile device such as, but not limited to, a portable communication terminal (e.g., a mobile phone, etc.), a smartphone, a tablet, a personal computer (PC), a wearable device, a healthcare device, an Internet of things (IoT) device, a Personal Computer (PC), a laptop computer, a server, a media player, a gaming console, a camera, a robotic device, and/or an automotive device (e.g., a navigation device), etc., but the example embodiments are not limited thereto. Further, the host unit 110 apart from the processing unit 112 may also comprise one or more image capturing device, one or more input means, one or more output means, one or more sensors, at least one display device, at least one power source, and/or at least one connecting interface, etc., but is not limited thereto.

In at least one example embodiment, the processing unit 112 may be implemented as a separate semiconductor chip. As an example, the processing unit 112 may be any one of a plurality of modules included in an application processor (AP). The AP may be implemented as a System on Chip (SoC), but is not limited thereto.

The processing unit 110 is configured to execute at least one operating system, etc., but is not limited thereto. The operating system may include at least one device driver for controlling the storage unit 116. The device driver may be a software module, e.g., a Kernel module containing computer readable instructions, etc., but is not limited thereto. In at least one example embodiment, the host unit 110 may send requests for performing memory operations. The host unit 110 may request a write operation and/or a read operation, etc., on the storage unit 116 through the device driver. In some example embodiments, the host unit 110 comprises an embedded volatile memory, but is not limited thereto.

In at least one example embodiment, the storage unit 120 may be an external storage device, such as Solid-State Drive (SSD) device, a hard disk drive, etc., that includes a non-volatile and/or flash-based memory 124, etc. Additionally, and/or alternatively, the storage unit 116 may be an embedded device. The storage unit 120 may include a persistent storage 118, a memory controller 120, an embedded volatile memory 122 and/or non-volatile (NVM) or flash-based memory 124, etc. The flash memory 124 may be removable external memory. In at least one example embodiment, persistent storage 118 is a NVM and/or memory module located outside the flash memory 124. Persistent storage 128 is a data storage device that retains data after power to the storage unit is shut off. The persistent storage 128 may be implemented as a separate chip, module, and/or device, etc.

In at least one example embodiment, the embedded volatile memory of the storage unit 120 may be a static random-access memory (SRAM) and/or dynamic RAM (DRAM) configured to temporarily store data in response to requests from the host unit 110, but the example embodiments are not limited thereto. In at least one example embodiment, the volatile memory 122 may be a DDR5 DRAM, but is not limited thereto. DDR5 DRAM provides higher data rates and facilitates increased density and/or bandwidth while reducing power consumption. In another example embodiment, the volatile memory 122 may include plurality of dual-inline memory modules, e.g., memory channels known as DIMMs, but is not limited thereto.

In at least one example embodiment, the memory controller 120 may either be part of the storage unit 116 or may be part of and/or implemented in processing unit 112, but the example embodiments are not limited thereto. Each configuration described herein may be made up of separate chips, modules, and/or devices, etc., and/or may be included inside a single chip/module/device, etc.

In the inventive concepts, the memory controller 120 is configured to perform a DFE technique for improving the boot process. The decision feedback equalization (DFE) training generates equalization values to correct signals and mitigates the effects of inter-symbol interference (ISI). However, DFE training adds extra delay to the booting time due to its complex procedures.

Further, as the number of DIMMs in the volatile memory 122 increases, more time may be needed for DFE trainings resulting in larger delays in the boot process. One or more example embodiments of the inventive concepts address these and other problems by reducing the number of DFE trainings desired and/or needed by the memory device while also predicting accurate DFE tap values such that a desired eye is maintained.

In one or more example embodiments, a system 100 for booting a memory device using a Decision Feedback Equalizer (DFE) training technique is disclosed. The system 100 comprises a memory controller 120 associated with the volatile memory 122, and at least one processor 112 coupled to the memory controller 120, but the example embodiments are not limited thereto. The processor 112 is configured to predict one or more DFE tap values based on a plurality of configuration parameters of the memory (e.g., volatile memory 122, etc.). The processor 112 is further configured to determine an accuracy level of the predicted one or more DFE tap values by comparing a signal received using the predicted one or more DFE tap values with a signal received using a set of comparative DFE tap values (e.g., optimal DFE tap values and/or improved DFE tap values, etc.) obtained from a trained (and/or pre-trained) machine learning (ML) model. In other words, the processor 112 may compare the results of a signal processed using the predicted one or more DFE tap values with the results of the same signal processed using the comparative DFE tap values to determine whether the predicted one or more DFE tap values provides a signal with less distortion, interference, and/or noise, e.g., less ISI, etc., than the comparative DFE tap values. The processor 112 is further configured to determine when the accuracy level of the signal processed using the predicted DFE tap values is above (e.g., exceeds) an accuracy threshold value (e.g., a desired accuracy threshold value, etc.) and set a value of a prediction flag as TRUE. The processor 112 is further configured to validate a plurality of eye margins based on the predicted DFE tap values, store the predicted DFE tap values after the validation, and perform the subsequent boot process of the memory using the predicted DFE tap values. The processor 112 is further configured to determine whether the accuracy level is below the accuracy threshold value, and in response to the accuracy level being below the accuracy threshold value, set the value of the prediction flag as FALSE and perform the above operations until the value of the prediction flag is set as TRUE.

In some example embodiments of the inventive concepts, the plurality of configuration parameters comprises one or more of: alternating current (AC) parameters, direct current (DC) parameters, total number of Dual In-line Memory Module (DIMMs) in the memory, and size of the DIMMs, etc., but is not limited thereto.

In some example embodiments of the inventive concepts, when the accuracy level is above an accuracy threshold value, the processor 112 is further configured to determine whether the plurality of eye margins is within a margin threshold range (e.g., eye margin threshold range).

In some example embodiments of the inventive concepts, when the plurality of eye margins is not within the margin threshold range, the processor 112 is further configured to set the value of the prediction flag as FALSE.

In at least one example embodiment, the processor 112 is further configured to improve and/or optimize the memory training by performing training, such as voltage training and/or On-Die Termination (ODT) training, etc., but is not limited thereto.

Referring now to FIG. 2 which illustrates a flow chart of a method 200 performed for booting a memory using a Decision Feedback Equalizer (DFE) training technique in accordance with at least one example embodiment of the inventive concepts. The various operations of method 200 may be performed by the processing unit 112 and the memory controller 120, or may be performed by the memory controller 120 itself.

The method 200 comprises operation 202 for prediction of one or more DFE tap values based on a plurality of configuration parameters of the memory. In some example embodiments of the inventive concepts, the plurality of configuration parameters comprises one or more of: AC parameters, DC parameters, total number of DIMMs in the memory, and a size of the DIMMs, etc., but is not limited thereto. In at least one example embodiment, the configuration parameters may be the AC parameters such as frequency, signal phase-change, etc., and/or DC parameters such as resistance of ODT resistors, gain associated with CTLE, etc. Other configuration parameters may include the configuration information of a particular DIMM such as the density of DIMM and/or the total number of DIMMs in the volatile memory 122, etc. It must be noted that one or more of the example embodiments of the inventive concepts may consider various other configuration parameters that are associated with storage unit and are not limited to the above-mentioned parameters.

The method further comprises operation 204 of determination of an accuracy level of the predicted one or more DFE tap values by comparing the predicted one or more DFE tap values with a set of comparative (e.g., desired and/or optimal) DFE tap values obtained from a trained (and/or pre-trained) machine learning (ML) model. In at least one example embodiment, the trained ML model may be stored in the persistent memory (and/or non-volatile memory) and utilized in improving and/or optimizing the DFE training. In one or more example embodiments of the inventive concepts, past DFE tap values may be stored in a persistent storage device (and/or non-volatile memory) and may be utilized for training the ML model. In at least one example embodiment, the configuration parameters may also be stored in the persistent storage 118 (and/or non-volatile memory) and utilized in training the ML model.

The training process of the ML model is an iterative process that gradually improves the DFE tap values such that it reduces and/or eliminates the ISI from the data signals. Each successive training cycle may be performed to improve the DFE tap values. The training process is performed through multiple iterations until acceptable DFE tap values are obtained. The number of iterations for training the ML model may vary depending on the type of ML algorithm used.

In at least one example embodiment, the persistent storage 118 is accessible to the memory controller 120 during the DFE training phase. For the current boot cycle, the memory controller 120 is configured to retrieve from the persistent storage 118 the configuration parameters and the validated and improved and/or optimized DFE tap values.

These improved and/or optimized DFE tap values were stored in the persistent storage 118 during the previous boot cycle.

Further, the method 200 comprises operation 206 of determining when the accuracy level is above an accuracy threshold value, the method includes setting a value of a prediction flag as TRUE, validating a plurality of eye margins based on the predicted DFE tap values, storing the predicted DFE tap values after the validation, and performing the subsequent boot process of the memory using the predicted DFE tap values.

After setting the value of prediction flag as TRUE, the predicted DFE tap values are validated through a margin analysis process. Margin analysis process is a validation process where for each predicted DFE tap value, the health and/or quality of the data signals processed using the predicted DFE tap value(s) are determined. Based on the results of the determination, the validated DFE tap value is stored for the current booting process in the persistent storage 118.

In some example embodiments of the inventive concepts, validating the plurality of eye margins further comprises determining whether the plurality of eye margins of the signal processed using the predicted DFE tap values is within a margin threshold range (e.g., eye margin threshold range). In some example embodiments of the inventive concepts, when the plurality of eye margins is not within the margin threshold range, the method further comprises setting the value of the prediction flag as FALSE.

The method 200 further comprises operation 208 of determining when the accuracy level goes below the accuracy threshold value, the method includes setting the value of the prediction flag as FALSE, and then repeating operations 202-208 until the value of the prediction flag is set as TRUE (e.g., the accuracy level of the predicted DFE tap values are above the accuracy threshold value and the plurality of eye margins are within the margin threshold range).

According to at least one example embodiment, when the first booting process is performed, hereinafter referred to as Boot 1, an initial set of DFE tap values are stored within a persistent storage along with the configuration parameters. Further, these initial DFE tap values are then modelled using an ML model, to obtain a set of comparative (e.g., desired and/or optimal) DFE tap values. In at least one example embodiment, the ML model may be trained and/or pre-trained. In another example embodiment, the ML model may be iteratively trained by adjusting and/or tuning the parameters of the ML model so that the ML model achieves the desired results.

Thus, according to at least one example embodiment of the inventive concepts, the ML model re-utilizes desired and/or essential boot data (such as the improved and/or optimal DFE tap values and/or configuration parameters, etc.) collected during previous boot process(es) and utilizes the boot data in the next and/or subsequent boot process, thereby saving the time and/or resources that would conventionally be consumed in performing the same DFE training during each boot process. Thus, the DFE training may be skipped during a boot process, if the currently predicted DFE values have accuracy above a desired accuracy threshold value, such as 90%, etc., in comparison to the previously validated (e.g., improved and/or optimal) values predicted during the previous boot process.

FIG. 3 illustrates a flow chart of another example method 300 for booting a memory using a DFE training technique, in accordance with at least one example embodiment of the inventive concepts.

The method 300 may include, at operation 302, determining one or more system configuration parameters based on configurations of the volatile memory 122 and/or other factors. Operation 302 is a pre-cursor to the system boot process (e.g., during system startup and/or system reset/restart). When the storage unit receives a boot process request, the system initiates the proposed method 300 (e.g., performs operation 302, etc.). In some example embodiments of the inventive concepts, the plurality of configuration parameters comprises one or more of: AC parameters, DC parameters, total number of DIMMs in the memory, and/or size of the DIMMs, etc.

As shown in operation 304 of FIG. 3, after determining the system configuration parameters, the memory controller 120 predicts improved and/or optimal DFE tap values (e.g., predicted DFE tap values, new DFE tap values, estimated DFE tap values, etc.) based on the system configuration parameters. This operation of estimating DFE tap values based on system configuration parameters is usually performed by the MRC, but is not limited thereto. The predicted DFE tap values are then applied to the data paths of the signal.

Further, at operation 306 of FIG. 3, modelled tap values are obtained from a trained and/or pre-trained ML model. The trained and/or pre-trained ML model utilizes past DFE values that may be stored in the persistent storage 118 and/or non-volatile memory, etc. The trained and/or pre-trained ML model may be trained through one or more desired and/or pre-determined ML training algorithms for generating comparative (e.g., improved and/or optimal) DFE tap values. In at least one example embodiment, the past DFE values may be used as hyperparameters to train the ML model to generate modelled and/or comparative DFE values that lead to the open-eye responses for the received signals, but the example embodiments are not limited thereto.

At operation 308 of FIG. 3, the processing unit 112 then compares the predicted DFE tap values with the modelled and/or comparative DFE tap values to determine the accuracy level of the predicted DFE tap values. That is, if the signal processed using the predicted DFE tap values are closer to the modelled and/or comparative DFE tap values, it implies that the predicted DFE tap values are accurate and may be used in DFE technique. Here, the accuracy level so generated denotes a percentage value, for example, an accuracy level of 90% denotes that the predicted tap values are very close to the improved and/or optimal DFE tap value and are accurate by, for example, at least 90%, but the example embodiments are not limited thereto.

At operation 310 of FIG. 3, the determined accuracy level is then checked with a desired and/or predetermined accuracy threshold value. The desired and/or predetermined accuracy level may be stored in the persistent storage 118 and/or non-volatile memory, etc. If the desired and/or predetermined accuracy threshold value is set as, e.g., 90% and the determined accuracy level is 80%, e.g., the determined accuracy level is less than the accuracy threshold value, the subsequent boot process is initiated at operation 322, but the example embodiments are not limited thereto, and the accuracy threshold value may be set at different values based on user preferences, experiential data, quality of service parameters, etc. In the case when the determined accuracy level is equal to or above the accuracy threshold value, the processing unit sets the fit for prediction flag as TRUE, at operation 312. In at least one example embodiment, the flag may have one of the two values: TRUE or FALSE. The default value of fit for prediction flag is FALSE.

In operation 314 of FIG. 3, the fit for prediction flag is checked for being TRUE. In the case where the fit for prediction flag is FALSE, the method moves to operation 302 and operation 302 is re-initiated (e.g., re-performed).

On the other hand, if the fit for prediction flag is TRUE, the method moves to the operation 316. At operation 316, the predicted DFE tap values are validated for eye margins. Here, a data signal is generated after applying the DFE technique using the predicted DFE tap values. Further, the eye margins, e.g., an eye width and/or an eye height, of the data signal(s) generated using the predicted DFE tap values are determined. The determined eye margins are then compared with a margin threshold range, wherein the margin threshold range may be set based on user preferences, experiential data, quality of service parameters, etc. This process is done to check the data integrity of the generated signal. If the eye margins are within the margin threshold range, the predicted DFE values are validated and accordingly may be stored in the persistent storage 118 at operation 320. In the case where the determined eye margins are not within the margin threshold range, the method moves to operation 318, where the processing unit sets the fit for prediction flag to FALSE, the method moves to operation 302 and operation 302 is re-initiated and/or re-performed. At operation 322, the subsequent (e.g., next) boot process is initiated.

In light of the technical advancements provided by the proposed methods and/or systems, etc., implementing the operations as discussed above, the methods are not routine, conventional, and/or well-known aspects in the art, as the operations provide the aforesaid solutions to the technical problems existing in the conventional technologies. Further, the operations clearly bring an improvement in the functioning of the computer system itself because the operations provide a technical solution to a technical problem.

The above methods 200 and/or 300 may be performed using computer-executable instructions being executed by processing circuitry. More specifically, computer-executable instructions implementing and/or embodying one or more operations of methods 200 and/or 300 may be special purpose and/or custom computer-executable instructions including routines, programs, objects, components, data structures, procedures, modules, and/or functions, etc., capable of performing specific functions and/or implement specific abstract data types corresponding to the method operations described above when executed by processing circuitry, thereby turning the processing circuitry into special purpose processing circuitry.

The order in which the various operations of the methods are described is not intended to be construed as a limitation, and any number of the described method operations can be combined in any order and/or rearranged to implement the method. Additionally, individual operations may be deleted from the methods without departing from the spirit and scope of the inventive concepts described herein. Furthermore, the methods can be implemented in any suitable hardware or combination of hardware and software and/or firmware.

The various operations of methods described above may be performed by any suitable hardware and/or combination of hardware and software capable of performing the corresponding functions. For example, the methods may include various hardware and/or software component(s) and/or module(s) as shown in FIGS. 1-3. Generally, where there are operations illustrated in Figures, those operations may have corresponding counterpart means-plus-function components.

It may be noted here that the subject matter of some or all example embodiments described with reference to FIGS. 2-3 may be relevant for the methods and the same is not repeated for the sake of brevity.

In one or more example embodiments of the inventive concepts, one or more non-transitory computer-readable media may be utilized for implementing one or more example embodiments consistent with the inventive concepts. Certain aspects may comprise a computer program product for performing the operations presented herein. For example, such a computer program product may comprise a computer-readable media having special purpose computer readable instructions stored (and/or encoded) thereon, the computer readable instructions being executable by one or more processors and/or processing circuitry to perform the operations described herein. For certain aspects, the computer program product may include packaging material, etc.

Various components, modules, and/or units are described to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware, etc.

We claim:

1. A method for booting a memory device using a Decision Feedback Equalizer (DFE) training technique, the method comprising:
   predicting one or more DFE tap values based on a plurality of configuration parameters of the memory device;
   determining an accuracy level of the predicted one or more DFE tap values based on a signal processed using the predicted one or more DFE tap values and the signal processed using a set of comparative DFE tap values obtained from a trained machine learning (ML) model; and
   in response to the accuracy level of the predicted one or more DFE tap values being above an accuracy threshold value,
      setting a value of a prediction flag as TRUE,
      validating a plurality of eye margins of the signal processed using the predicted one or more DFE tap values,
      storing the predicted one or more DFE tap values based on results of the validation, and
      performing a subsequent boot process of the memory device using the predicted one or more DFE tap values.

2. The method as claimed in claim 1, wherein the plurality of configuration parameters comprises one or more of:
   alternating current (AC) parameters, direct current (DC) parameters, total number of Dual In-line Memory Modules (DIMMs) in the memory device, size of the DIMMs, or any combinations thereof.

3. The method as claimed in claim 1, wherein the validating the plurality of eye margins further comprises:
   determining whether the plurality of eye margins is within an eye margin threshold range.

4. The method as claimed in claim 3, wherein in response to the plurality of eye margins not being within the eye margin threshold range, the method further comprises:
   setting the value of the prediction flag as FALSE.

5. The method as claimed in claim 1, wherein the memory device is a Double Data Rate (DDR) 5 Dynamic Random Access Memory (DRAM).

6. A system for booting a memory device using a Decision Feedback Equalizer (DFE) training technique, comprising:

processing circuitry configured to:

predict one or more DFE tap values based on a plurality of configuration parameters of the memory device;

determine an accuracy level of the predicted one or more DFE tap values based on a signal processed using the predicted one or more DFE tap values and the signal processed using a set of comparative DFE tap values obtained from a trained machine learning (ML) model; and in response to the accuracy level being above an accuracy threshold value, set a value of a prediction flag as TRUE, validate a plurality of eye margins of the signal processed using the predicted one or more DFE tap values, store the predicted one or more DFE tap values based on results of the validation, and perform a subsequent boot process of the memory device using the predicted one or more DFE tap values.

7. The system as claimed in claim 6, wherein the plurality of configuration parameters comprises one or more of:

alternating current (AC) parameters, direct current (DC) parameters, total number of Dual In-line Memory Modules (DIMMs) in the memory device, and a size of the DIMMs.

8. The system as claimed in claim 6, wherein in response to the accuracy level being above the accuracy threshold value, the processing circuitry is further configured to:

determine whether the plurality of eye margins is within an eye margin threshold range.

9. The system as claimed in claim 8, wherein in response to the plurality of eye margins not being within the eye margin threshold range, the processing circuitry is further configured to:

set the value of the prediction flag as FALSE.

10. The system as claimed in claim 6, wherein the memory device is a Double Data Rate (DDR) 5 Dynamic Random Access Memory (DRAM).

* * * * *